(12) United States Patent
Zhao et al.

(10) Patent No.: US 11,816,443 B2
(45) Date of Patent: Nov. 14, 2023

(54) METHOD, DEVICE, AND STORAGE MEDIUM FOR GENERATING RESPONSE

(71) Applicant: BEIJING BAIDU NETCOM SCIENCE AND TECHNOLOGY CO., LTD., Beijing (CN)

(72) Inventors: Xiaojun Zhao, Beijing (CN); Meng Wang, Beijing (CN); Qingwei Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 243 days.

(21) Appl. No.: 17/382,829

(22) Filed: Jul. 22, 2021

(65) Prior Publication Data

US 2021/0350085 A1 Nov. 11, 2021

(30) Foreign Application Priority Data

Dec. 24, 2020 (CN) .......................... 202011554184.8

(51) Int. Cl.
*G06F 40/35* (2020.01)
*G06F 16/332* (2019.01)
(Continued)

(52) U.S. Cl.
CPC .......... *G06F 40/35* (2020.01); *G06F 11/3438* (2013.01); *G06F 16/3325* (2019.01);
(Continued)

(58) Field of Classification Search
CPC ...... G06F 40/35; G06F 11/3438; G06F 11/34; G06F 16/3325; G06F 16/332; G06F 16/3329; G06F 18/22; G06F 40/279; G06F 16/3334; G06F 16/3335; G06F 16/33; H04L 67/535

See application file for complete search history.

(56) References Cited

U.S. PATENT DOCUMENTS

2017/0293834 A1* 10/2017 Raison ..................... G06F 40/40
2020/0380077 A1    12/2020 Ge et al.
2020/0380991 A1* 12/2020 Ge ............................ G10L 15/22

FOREIGN PATENT DOCUMENTS

JP  2002023783 A   1/2002
JP  2018194902 A  12/2018
WO 2018204288 A1  11/2018

OTHER PUBLICATIONS

Extended European Search Report for Application No. 21187693.3, dated Jan. 18, 2022, 13 pages.

(Continued)

*Primary Examiner* — Huyen X Vo
(74) *Attorney, Agent, or Firm* — Lippes Mathias LLP (57) ABSTRACT

The disclosure provides a method and an apparatus for generating a response, an electronic device, and a storage medium. The method includes: obtaining a current user request in a current conversation and historical coreference information in the current conversation; extracting content matching the current user request from the historical coreference information; updating the current user request based on the content to obtain an updated current user request; and generating a response of the current user request based on the updated current user request.

14 Claims, 6 Drawing Sheets

(51) Int. Cl.
*G06F 40/279* (2020.01)
*G06F 11/34* (2006.01)
*G06F 18/22* (2023.01)

(52) U.S. Cl.
CPC .......... *G06F 16/3329* (2019.01); *G06F 18/22* (2023.01); *G06F 40/279* (2020.01)

(56) References Cited

OTHER PUBLICATIONS

Coreference-Wikipedia, https://en.wikipedia.org/w/index.php?title=Coreference&oldid=957784371, XP055876831, May 20, 2020, 4 pages.
Ordinal numeral-Wikipedia, https://en.wikipedia.org/w/index.php?title=Ordinal_numeral&oldid=99391540, XP055876848, Dec. 13, 2020, 3 pages.
Lvliang, Mao et al.; "Complement Rule, Examination of Framework of Input Complement Using Utterance History", 5Q-4 The 69th National Congress of Information Processing Society; Feb. 14, 2005; 10 pages.
Japanese Office Action for Patent Application No. 2021-197234 dated Feb. 14, 2023, 9 pages.

\* cited by examiner

METHOD, DEVICE, AND STORAGE MEDIUM FOR GENERATING RESPONSE

CROSS-REFERENCE TO RELATED APPLICATION

This application is based on and claims priority to Chinese Patent Application No. 202011554184.8 filed on Dec. 24, 2020, the content of which is hereby incorporated by reference in its entirety into this disclosure.

TECHNICAL FIELD

The disclosure relates to the field of computer technologies, specifically to the field of artificial intelligence (AI) technologies such as big data and deep learning (DL), and more particularly to a method for generating a response, an electronic device, and a storage medium.

BACKGROUND

Multi-turn conversation technologies may be maturing as the development of natural language technologies. Therefore, multi-turn conversation systems may be applicable to various services in all walks of life, which improves the efficiency of customer services and reduces the enterprise cost.

The multi-turn conversation systems in the related art typically may employ a slot filling means or an improved version of the slot filling means to generate responses. The conversation capability of these systems is relatively single, and the conversation interaction of these systems is generally realized based on preset flows. Therefore, it has become a problem to be solved how to better generate responses.

SUMMARY

According to a first aspect of the disclosure, a method for generating a response is provided. The method includes: obtaining a current user request in a current conversation and historical coreference information in the current conversation; extracting content matching the current user request from the historical coreference information; updating the current user request based on the content to obtain an updated current user request; and generating a response of the current user request based on the updated current user request.

According to a second aspect of the disclosure, an electronic device is provided. The device includes: at least one processor; and a memory communicating with the at least one processor; in which, the memory is configured to store instructions executable by the at least one processor, and when the instructions are executed by the at least one processor, the at least one processor is caused to perform the method for generating the response according to the first aspect of the disclosure.

According to a third aspect of the disclosure, a non-transitory computer-readable storage medium storing computer instructions is provided, in which the computer instructions are configured to cause a computer to perform the method for generating the response according to the first aspect of the disclosure.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to understand the solution better, and do not constitute a limitation on the solution, in which.

DETAILED DESCRIPTION

The following describes the exemplary embodiments of the disclosure with reference to the drawings, which includes various details of the embodiments of the disclosure to facilitate understanding and shall be considered merely exemplary. Therefore, those skilled in the art should recognize that various changes and modifications may be made to the embodiments described herein without departing from the scope and spirit of the disclosure. For clarity and conciseness, descriptions of well-known functions and structures are omitted in the following description.

Multi-turn conversation technologies may be maturing as the development of natural language technologies. Therefore, multi-turn conversation systems may be applicable to various services in all walks of life, which improves the efficiency of customer services and reduces the enterprise cost.

The multi-turn conversation systems in the related art typically may employ a slot filling means or an improved version of the slot filling means to generate responses. The conversation capability of these systems is relatively single, and the conversation interaction of these systems is generally realized based on preset flows. Coreference may be common in conversations of various services. Coreference inheritance (coreference spanning multiple turns of conversations) is important to improve the user's conversation experience. For example, a coreference conversation logic (clarifying the coreference and associating the question coreference to the question-and-answer) may be completed in a certain turn of conversation. After multiple turns of conversations, when the user's description is changed into the $x^{th}$, to describe the preceding query that triggering coreference with an entity represented by an ordinal number, or to describe the preceding coreference option, or the like, the previous coreference may be selected again to complete the corresponding coreference conversation logic.

For example, clarifying the coreference may be understood as determining the question expressed by the user, and providing three responses for the question: there is an answer, there is no answer, and which of the following 3 options is required such as a serial number, a location, and the user may select which option or the serial number through the electronic device. Associating the question coreference to the question-and-answer may be understood as that, for example, when the user request obtained is how to buy a ticket, it may guide the user whether to ask other questions; under a case that the question is answered normally, other questions are recommended so that the user may select other questions. The triggering coreference may be understood as, for example, determining the question expressed by the user, determining response options for the question as A, B, C, and the user selects the first option through the electronic device, and then the user selects the second option, and then the second option may be determined as the triggering coreference.

Therefore, better implementation of supporting the coreference inheritance in the conversation system plays an important role in improving the overall capabilities of the multi-turn conversation system, increasing the scene coverage of the conversation system, and enhancing the user's conversation experience. Therefore, it has become an urgent problem to be solved how to better generate responses and support the coreference inheritance in the conversation system.

To solve the problem, the disclosure provides a method and an apparatus for generating a response, an electronic device, and a storage medium. In the disclosure, a current user request in a current conversation and historical coreference information in the current conversation are obtained. Content matching the current user request is extracted from the historical coreference information. The current user request is updated based on the content to obtain an updated current user request. A response of the current user request is generated based on the updated current user request. A coreference conversation logic may be performed again by flexibly utilizing the historical coreference information. The number of conversation turns may be reduced. The access and the complexity configured for the multi-turn conversations system may be lowered. The smoothness of the user conversation may be improved.

The following describes a method and an apparatus for generating a response, an electronic device, and a storage medium in the embodiments of the disclosure with reference to the drawings.

Figure 1:
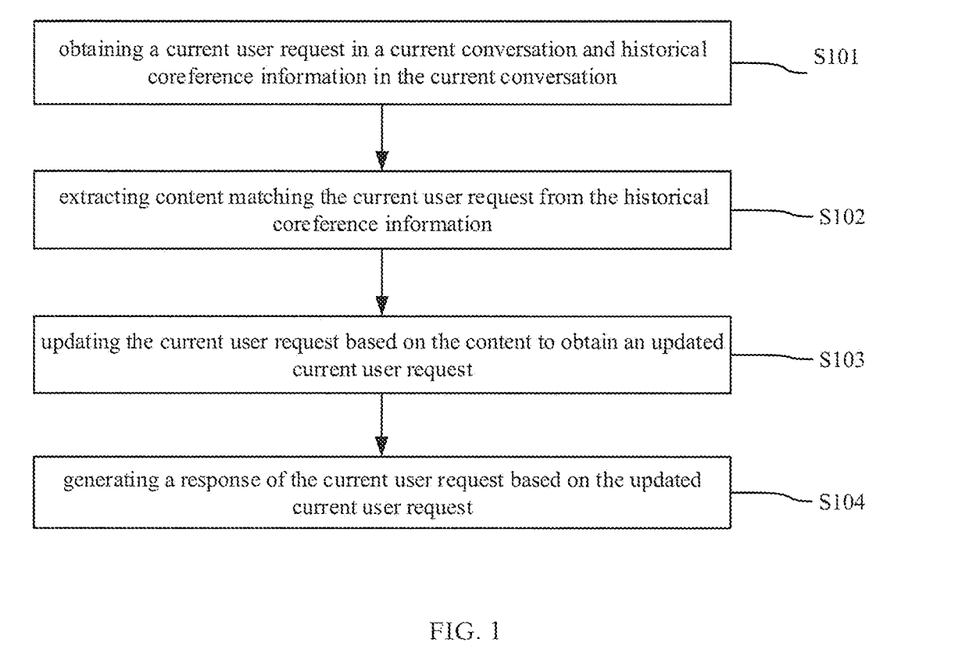
FIG. 1 is a flowchart illustrating a method for generating a response according to some embodiments of the disclosure.

FIG. 1 is a flowchart illustrating a method for generating a response according to some embodiments of the disclosure. It should be noted that, the method for generating the response in embodiments of the disclosure may be applicable to an apparatus for generating a response in embodiments of the disclosure. The apparatus may be a hardware device or a software in a hardware device. The apparatus may be also applicable to an electronic device. The electronic device may include a terminal device or a server. For example, the terminal device includes a smart phone, a tablet computer, a PAD, a personal digital assistant, etc., which is not limited in embodiments of the disclosure.

At S101, a current user request in a current conversation and historical coreference information in the current conversation are obtained.

In some embodiments of the disclosure, the user may input information in a current conversation box through an electronic device. Therefore, the information input by the user may be received; and the current user request in the current conversation may be obtained.

The historical coreference information may be prestored in a server.

In some embodiments of the disclosure, the current user request in the current conversation is obtained to determine the current conversation where the current user request belongs to, further to obtain the historical coreference information in the current conversation.

The historical coreference information includes one or more historical user requests triggering coreference, and a plurality of coreference options corresponding to each historical user request.

For example, the user may input "I'd like to check my balance" in the current conversation box through the electronic device. Therefore, "I'd like to check my balance" input by the user may be received and the current user request may be determined to be "I'd like to check my balance". A "checking balance" conversation where "I'd like to check my balance" belongs to may be determined. The historical user request of "checking balance" may be obtained and coreference options corresponding to the historical user request, for example, 1. check credit card balance, 2. cheek bank card balance, and 3. how to check bank card balance, may be obtained.

At S102, content matching the current user request is extracted from the historical coreference information.

That is, after the historical coreference information in the current conversation is obtained, the content matching the current user request may be extracted from the historical coreference information. For example, the content matching the current user request may be a historical user request or a coreference option.

As a possible implementation, after the historical coreference information in the current conversation is obtained, semantic matching may be performed between the historical coreference information and the current user request, so that the content matching the current user request may be extracted from the historical coreference information.

As another possible implementation, after the historical coreference information in the current conversation is obtained, template matching may be performed between the historical coreference information and the current user request, so that the content matching the current user request may be extracted from the historical coreference information.

It should be noted that, the current user request may include an entity represented by an ordinal number or not include an entity represented by an ordinal number. Correspondingly, the implementation modes of extracting the content matching the current user request from the historical coreference information may be different replying on whether the current user request includes the entity represented by the ordinal number or not. The specific implementation process may refer to the subsequent embodiments.

At S103, the current user request is updated based on the content to obtain an updated current user request.

That is, after the content matching the current user request is extracted from the historical coreference information, the current user request may be updated based on the content to obtain the updated current user request.

In some embodiments of the disclosure, when the content is the historical user request, a coreference option referred to by an entity represented by an ordinal number in the current user request may be determined based on a plurality of coreference options corresponding to the content and the current user request, and the coreference option referred to by the entity represented by the ordinal number in the current user request is taken as the updated current user request. When the content is the coreference option, the content is taken as the updated current user request.

At S104, a response of the current user request is generated based on the updated current user request.

That is, after the updated current user request is obtained, the response of the current user request may be generated based on the updated current user request.

In some embodiments of the disclosure, the updated current user request may be input to a model for generating content of requests, to generate the response of the current user request.

With the method for generating the response in some embodiments of the disclosure, the current user request in the current conversation and the historical coreference information in the current conversation are obtained. The content matching the current user request is extracted from the historical coreference information. The current user request is updated based on the content to obtain the updated current user request. The response of the current user request is generated based on the updated current user request. Therefore, the content matching the current user request is extracted from the historical coreference information, and the current user request is updated, and the response is generated based on the updated current user request. A coreference conversation logic may be performed again by flexibly utilizing the historical coreference information. The number of conversation turns may be reduced. The conversation efficiency may be improved. The access and the complexity configured for the multi-turn conversation system may be lowered. The smoothness of the user conversation may be improved and the user experience may be improved.

Figure 2:
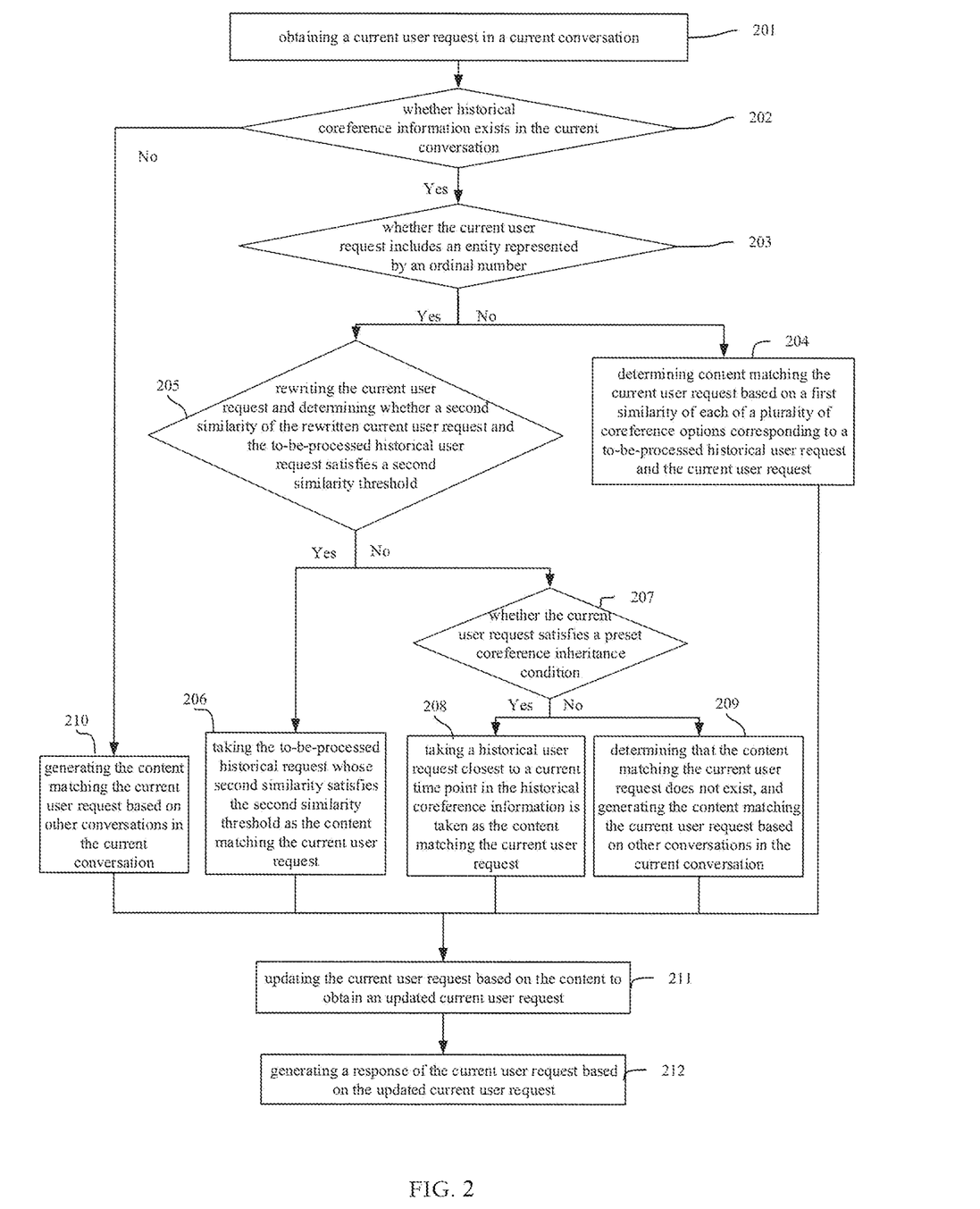
FIG. 2 is a flowchart illustrating a method for generating a response according to some specific embodiments of the disclosure.

To make those skilled in the art easily understand the disclosure, the disclosure provides a method for generating a response in some specific embodiments. It should be noted that the method for generating the response in some specific embodiments is a farther refinement or optimization of the above embodiments. FIG. 2 is a flowchart illustrating a method for generating a response according to some specific embodiments of the disclosure. As illustrated in FIG. 2, the method for generating the response may include the following.

At S201, a current user request in a current conversation is obtained.

For example, the user may input "I'd like to check my balance" in the current conversation box through the electronic device. Therefore, "I'd like to check my balance" input by the user may be received and the current user request may be determined to be "I'd like to check my balance".

At S202, it is determined whether historical coreference information exists in the current conversation. If yes, the action at S203 is executed; if no, the action at S210 is executed.

The historical coreference information includes one or more historical user requests triggering coreference, and a plurality of coreference options corresponding to each historical user request.

As a possible implementation, after the current user request in the current conversation is obtained, the current conversation where the current user request belongs to may be determined, and it is determined whether the history reference conversation exists in the current conversation where the current user request belongs to.

At S203, when the historical coreference information exists in the current conversation, it may be determined whether the current user request includes an entity represented by an ordinal number. If no, the action at S204 is executed; if yes, the action at S205 is executed.

That is, after it is determined that the historical coreference information exists in the current conversation, it may be further determined whether the current user request includes the entity represented by the ordinal number.

The entity represented by the ordinal number may be understood as parameters required for completing a service action, for example, time, place, card number and other parameters similar to that in a function.

For example, when the current user request is "I want to check the balance of the card number 123456", it may be determined that the current user request includes the entity represented by the ordinal number, i.e., "the card number 123456".

At S204, when the current user request does not include the entity represented by the ordinal number, content matching the current user request may be determined based on a first similarity of each of a plurality of coreference options corresponding to a to-be-processed historical user request and the current user request.

In some embodiments of the disclosure, when the current user request does not include the entity represented by the ordinal number, a historical user request may be obtained sequentially in order of time from nearest to far from the historical coreference information as the to-be-processed historical user request, and the first similarity of the current user request and each of the plurality of coreference options corresponding to the to-be-processed historical user request is determined, and a coreference option whose first similarity satisfies the first similarity threshold is taken as the content matching the current user request.

The first similarity of each of the plurality of coreference options corresponding to the to-be-processed historical user request and the current user request may be determined by combining a bag-of-word model and a cosine similarity, or an unsupervised semantic similarity computation model based on word vectors, Which will not be limited herein.

At S205, when the current user request includes the entity represented by the ordinal number, the current user request is rewritten and it is determining whether a second similarity of the rewritten current user request and the to-be-processed historical user request satisfies a second similarity threshold. If yes, the action at S206 is executed, if no, the action at S207 is executed.

In some embodiments of the disclosure, when it is determined that the current user request includes the entity represented by the ordinal number, a historical user request may be obtained sequentially in order of time from nearest to far from the historical coreference information as the to-be-processed historical user request; the entity represented by the ordinal number and a meaningless word are removed from the current user request to generate a rewritten current user request; and the second similarity of the rewritten current user request and the to-be-processed historical user request is determined; and it is determined whether the second similarity of the rewritten current user request and the to-be-processed historical user request satisfies the second similarity threshold.

At S206, when the second similarity of the rewritten current user request and the to-be-processed historical user request satisfies the second similarity threshold, the to-be-processed historical request whose second similarity satisfies the second similarity threshold is taken as the content matching the current user request.

At S207, when the second similarity of the rewritten current user request and the to-be-processed historical user request does not satisfy the second similarity threshold, it is determined whether the current user request satisfies a preset coreference inheritance condition.

The coreference inheritance condition includes a plurality of relevant words of coreference inheritance.

In some embodiments of the disclosure, when it is determined that the second similarity of the rewritten current user request and the to-be-processed historical user request does not satisfy the second similarity threshold, it is determined whether one or more relevant words exist in the current user request. It is determined that the current user request satisfies the coreference inheritance condition when the one or more relevant words exist in the current user request.

At S208, when the current user request satisfies the preset coreference inheritance condition, a historical user request closest to a current time point in the historical coreference information is taken as the content matching the current user request.

At S209, when the current user request does not satisfy the preset coreference inheritance condition, it may be determined that the content matching the current user request does not exist.

In some embodiments of the disclosure, when it is determined that the one or more relevant words do not exist in the current user request, it may be determined that the current user request does not satisfy the preset coreference inheritance condition, and further it may be determined that the content matching the current user request does not exist.

In some embodiments of the disclosure, when it is determined that the content matching the current user request does not exist, the content matching the current user request may be generated based on other conversations in the current conversation.

At S210, the content matching the current user request is generated based on other conversations in the current conversation.

At S211, the current user request is updated based on the content to obtain an updated current user request.

In some embodiments of the disclosure, when the content is the historical user request, a coreference option referred to by an entity represented by an ordinal number in the current user request may be determined based on a plurality of coreference options corresponding to the content and the current user request, and the coreference option referred to by the entity represented by the ordinal number in the current user request is taken as the updated current user request. When the content is the coreference option, the content is taken as the updated current user request.

At S212, a response of the current user request is generated based on the updated current user request.

In some embodiments of the disclosure, the updated current user request may be input to a model for generating content of requests, to generate the response of the current user request.

In some embodiments of the disclosure, based on the corresponding relationship between the user request and the response, the response of the current user request may be generated based on the updated current user request.

To determine the historical coreference information more accurately, in some embodiments of the disclosure, after the response of the current user request information is generated based on the updated current user request, it may be determined whether the response includes a plurality of coreference options; when the response includes the plurality of coreference options, the historical coreference information of the current conversation is updated based on the current user request and the corresponding response.

With the method for generating the response in some embodiments of the disclosure, the current user request in the current conversation is obtained. It is determined whether the historical coreference information exists in the current conversation. When the historical coreference information exists in the current conversation, it may be determined whether the current user request includes the entity represented by the ordinal number. When the current user request includes the entity represented by the ordinal number, the current user request is rewritten and it is determining whether the second similarity of the rewritten current user request and the to-be-processed historical user request satisfies the second similarity threshold. When the second similarity of the rewritten current user request and the to-be-processed historical user request does not satisfy the second similarity threshold, it is determined whether the current user request satisfies the preset coreference inheritance condition. The content matching the current user request is further determined, and the current user request is updated based on the content to obtain the updated current user request, and the response of the current user request information is generated based on the updated current user request. A coreference conversation logic may be performed again by flexibly utilizing the historical coreference information. The coreference inheritance in the conversation process may be supported. The redundant configuration in the scene that needs to support the coreference inheritance may be greatly reduced. More conversation scenes may be covered and scenes relevant to the coreference may be supported. The number of conversation turns may be reduced. The conversation efficiency may be improved. The access and the complexity configured for the multi-turn conversation system may be lowered. The smoothness of the user conversation may be improved and the user experience may be improved. The construction cost the multi-turn conversation satisfies the requirement may be reduced.

Corresponding to the method for generating the response provided by the above embodiments, some embodiments of the disclosure further provides an apparatus for generating a response. Since the apparatus for generating the response provided in some embodiments of the disclosure corresponds to the method for generating the response provided in the above several embodiments of the disclosure, the implementation of the method for generating the response may also be applicable to the apparatus for generating the response provided in some embodiments, which will not be described in the embodiments.

Figure 3:
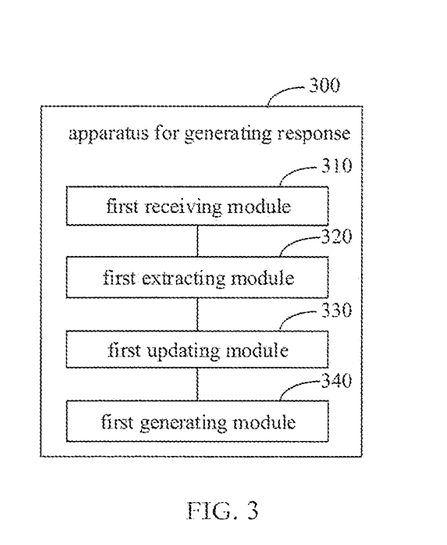
FIG. 3 is a block diagram illustrating an apparatus for generating a response according to some embodiments of the disclosure.

FIG. 3 is a block diagram illustrating an apparatus for generating a response according to some embodiments of the disclosure. As illustrated in FIG. 3, the apparatus 300 for generating the response includes a first obtaining module 310, a first extracting module 320, a first updating module 330, and a first generating module 340.

The first obtaining module 310 is configured to obtain a current user request in a current conversation and historical coreference information in the current conversation.

The first extracting module 320 is configured to extract content matching the current user request from the historical coreference information.

The first updating module 330 is configured to update the current user request based on the content to obtain an updated current user request. As an example, the historical coreference information includes one or more historical user requests triggering coreference, and a plurality of coreference options corresponding to each historical user request; and the first updating module 330 is specifically configured to: when the content is the historical user request, determine a coreference option referred to by an entity represented by an ordinal number in the current user request based on a plurality of coreference options corresponding to the content and the current user request; take the coreference option referred to by the entity represented by the ordinal number in the current user request as the updated current user request; and when the content is a coreference option, take the content as the updated current user request.

The first generating module 340 is configured to generate a response of the current user request based on the updated current user request.

Figure 4:
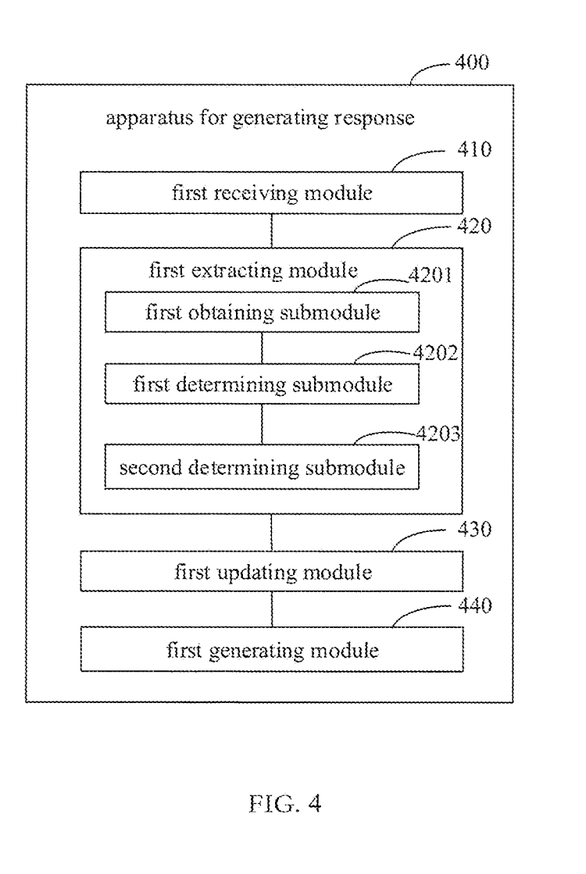
FIG. 4 is a block diagram illustrating an apparatus for generating a response according to some embodiments of the disclosure.

In some embodiments of the disclosure, as illustrated in FIG. 4, the historical coreference information includes one or more historical user requests triggering coreference, and a plurality of coreference options corresponding to each historical user request, and the first extracting module 420 includes: a first obtaining submodule 4201, a first determining submodule 4202, and a second determining submodule 4203. The first obtaining submodule 4201 is configured to, when the current user request does not include an entity represented by an ordinal number, obtain sequentially, in order of time from nearest to far, a historical user request from the historical coreference information as a to-be-processed historical user request. The first determining submodule 4202 is configured to determine a first similarity of the current user request and each of a plurality of coreference options corresponding to the to-be-processed historical user request. The second determining submodule 4203 is configured to take a coreference option whose first similarity satisfies a first similarity threshold as the content matching the current user request.

Modules 410 to 440 in FIG. 4 have the same functions and structures with modules 310 to 340 in FIG. 3.

Figure 5:
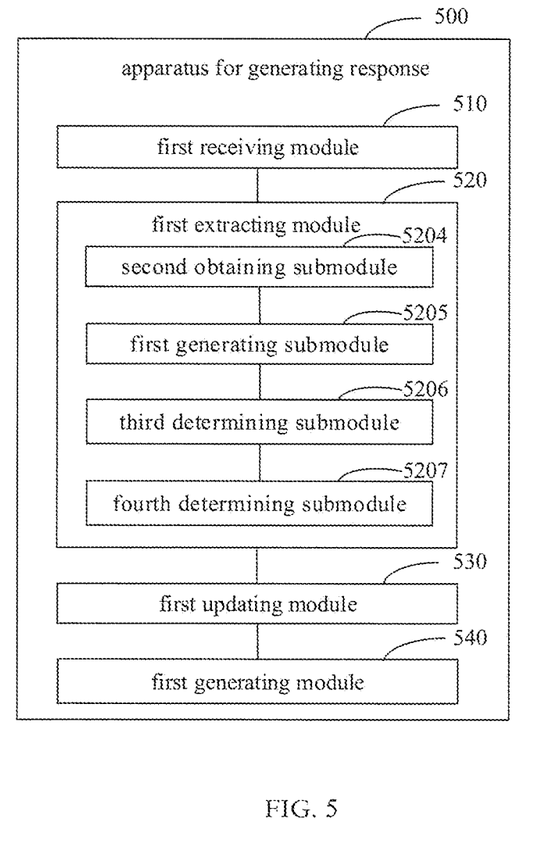
FIG. 5 is a block diagram illustrating an apparatus for generating a response according to some embodiments of the disclosure.

In some embodiments of the disclosure, as illustrated in FIG. 5, the first extracting module 520 further includes: a second obtaining submodule 5204, a first generating submodule 5205, a third determining submodule 5206, and a fourth determining submodule 2507. The second obtaining submodule 5204 is configured to, when the current user request includes an entity represented by an ordinal number, obtain sequentially, in order of time from nearest to far, a historical user request from the historical coreference information as a to-be-processed historical user request. The first generating submodule 5205 is configured to remove the entity represented by the ordinal number and a meaningless word from the current user request to generate a rewritten current user request. The third determining submodule 5206 is configured to determine a second similarity of the rewritten current user request and the to-be-processed historical user request. The fourth determining submodule 5207 is configured to take the to-be-processed historical request whose second similarity satisfies a second similarity threshold as the content matching the current user request.

Modules 510 to 540 in FIG. 5 have the same functions and structures with modules 310 to 340 in FIG. 3.

Figure 6:
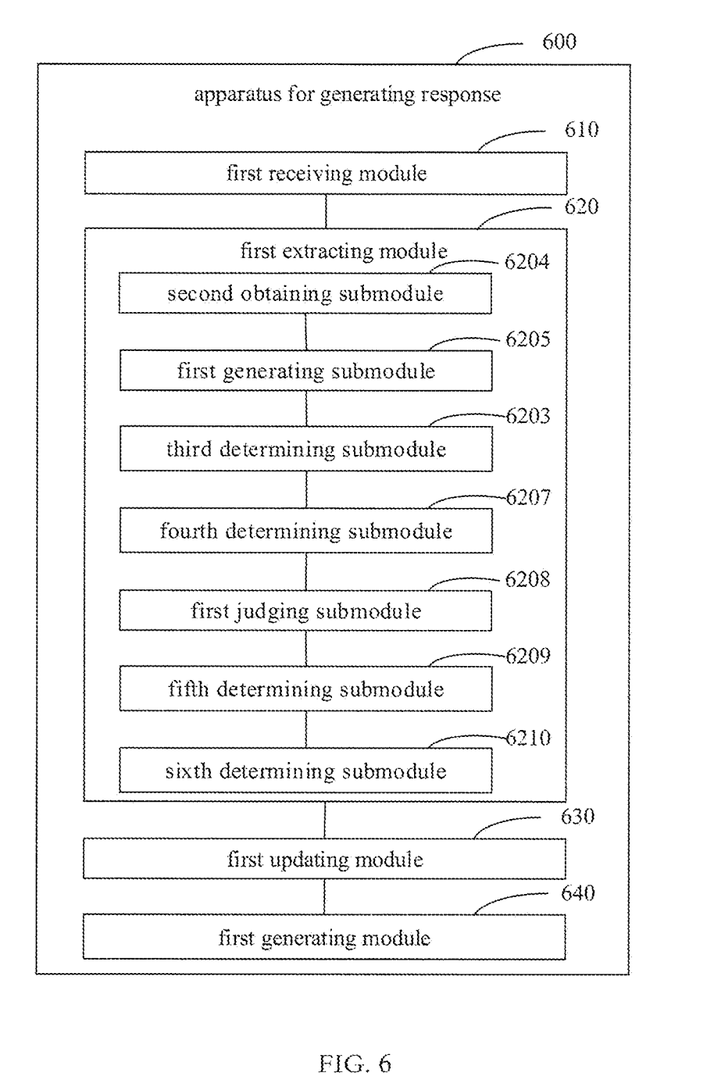
FIG. 6 is a block diagram illustrating an apparatus for generating a response according to some embodiments of the disclosure.

In some embodiments of the disclosure, as illustrated in FIG. 6, the first extracting module 620 further includes: a first judging submodule 6208, a fifth determining submodule 6209, and a sixth determining submodule 6210. The first judging submodule 6208 is configured to, when there is no to-be-processed historical request whose second similarity satisfies the second similarity threshold, determine whether the current user request satisfies a preset coreference inheritance condition. The fifth determining submodule 6209 is configured to, when the current user request satisfies the preset coreference inheritance condition, take a historical user request closest to a current time point in the historical coreference information as the content matching the current user request. The sixth determining submodule 6210 is configured to, when the current user request does not satisfy the preset coreference inheritance condition, determine that there is no content matching the current user request.

In some embodiments of the disclosure, the coreference inheritance condition includes a plurality of relevant words of coreference inheritance. The first judging submodule 6208 is specifically configured to determine whether one or more relevant words exist in the current user request; when one or more relevant words exist in the current user request, determine that the current user request satisfies the coreference inheritance condition; and when one or more relevant words do not exist in the current user request, determine that the current user request does not satisfy the coreference inheritance condition.

Modules 610 to 640 in FIG. 6 have the same functions and structures with modules 510 to 540 in FIG. 5.

Submodules 6204-6207 in FIG. 6 have the same functions and structures with submodules 5204-5207 in FIG. 5.

Figure 7:
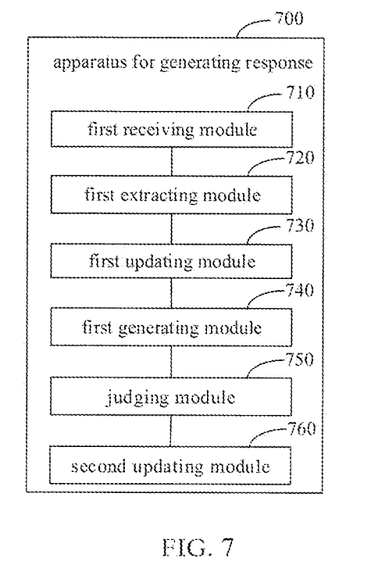
FIG. 7 is a block diagram illustrating an apparatus for generating a response according to some embodiments of the disclosure.

In some embodiments of the disclosure, as illustrated in FIG. 7, after the first generating module 740, the apparatus further includes: a judging module 750 and a second updating module 760. The judging module 750 is configured to determine whether the response includes a plurality of coreference options. The second updating module 760 is configured to, when the response includes the plurality of coreference options, update the historical coreference information of the current conversation based on the current user request and the corresponding response.

Modules 710 to 740 in FIG. 7 have the same functions and structures with modules 310 to 340 in FIG. 3.

With the apparatus for generating the response in some embodiments of the disclosure, the current user request in the current conversation and the historical coreference information in the current conversation are obtained. The content matching the current user request is extracted from the historical coreference information. The current user request is updated based on the content to obtain the updated current user request. The response of the current user request is generated based on the updated current user request. Therefore, the content matching the current user request is extracted from the historical coreference information, and the current user request is updated, and the response is generated based on the updated current user request. A coreference conversation logic may be performed again by flexibly utilizing the historical coreference information. The number of conversation turns may be reduced. The conversation efficiency may be improved. The access and the complexity configured for the multi-turn conversation system may be lowered. The smoothness of the user conversation may be improved and the user experience may be improved.

In the embodiments of the disclosure, an electronic device, a readable storage medium, and a computer program product are further provided according to some embodiments of the disclosure.

Figure 8:
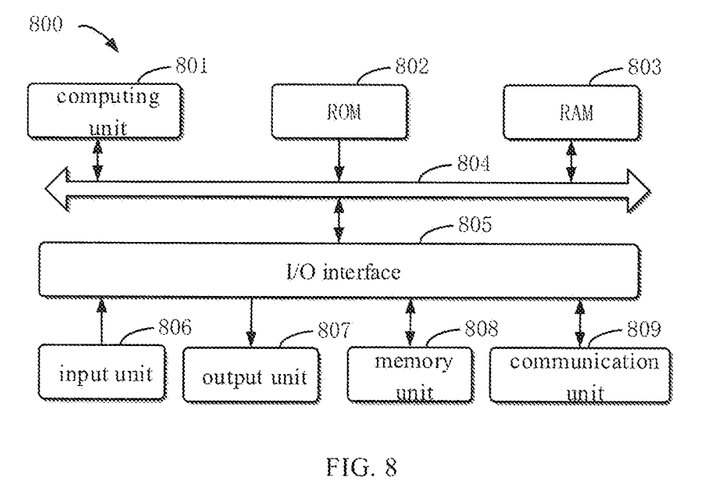
FIG. 8 is a block diagram illustrating an electronic device for implementing a method for generating a response according to some embodiments of the disclosure.

FIG. 8 is a block diagram illustrating an electronic device for implementing a method for generating a response according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the device 800 includes a computing unit 801. The computing unit 801 may execute various appropriate actions and processes according to computer program instructions stored in a read only memory (ROM) 802 or computer program instructions loaded to a random access memory (RAM) 803 from a storage unit 808. The RAM 803 may also store various programs and date required. The CPU 801, the ROM 802, and the RAM 803 may be connected to each other via a bus 804. An input/output (I/O) interface 805 is also connected to the bus 804.

A plurality of components in the device 800 are connected to the I/O interface 805, including: an input unit 806 such as a keyboard, a mouse; an output unit 807 such as various types of displays, loudspeakers; a storage unit 808 such as a magnetic disk, an optical disk; and a communication unit 809, such as a network card, a modem, a wireless communication transceiver. The communication unit 809 allows the device 800 to exchange information: data with other devices over a computer network such as the Internet and/or various telecommunication networks.

The computing unit 801 may be various general-purpose and/or special-purpose processing components having processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller microcontroller, etc. The computing unit 801 executes the above-mentioned methods and processes, such as the method. For example, in some implementations, the method may be implemented as computer software programs. The computer software programs are tangibly contained a machine readable medium, such as the storage unit 808. In some embodiments, a part or all of the computer programs may be loaded and/or installed on the device 800 through the ROM 802 and/or the communication unit 809. When the computer programs are loaded to the RAM 803 and are executed by the computing unit 801, one or more blocks of the method described above may be executed. Alternatively, in other embodiments, the computing unit 801 may be configured to execute the method in other appropriate ways such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine, or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In order to provide interaction with a user, the systems and technologies described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local region network (LAN), wide region network (WAN), and the Internet.

The computer system may include a client and a server. The client and server are generally remote from each other and interacting through a communication network. The client-server relation is generated by computer programs finning on the respective computers and having a client-server relation with each other. The server may be a cloud server, also known as a cloud computing server or a cloud host, which is a host product in the cloud computing service system to solve management difficulty and weak business scalability defects of traditional physical hosts and Virtual Private Server (VPS) services.

It should be noted that, Artificial intelligence(AI) is a subject that studies simulating certain thinking processes and intelligent behaviors (such as learning, reasoning, thinking, planning) of human beings by computers, which covers hardware-level technologies and software-level technologies. AI hardware technologies generally include technologies such as sensors, dedicated AI chips, cloud computing, distributed storage, big data processing. AI software technologies generally include computer vision technology, speech recognition technology, natural language processing (NLP) technology; machine learning (ML), deep learning (DL), big data processing technology, knowledge graph (KG) technology.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating a response, comprising:
   obtaining a current user request in a current conversation from information input by a user in a current conversation box through an electronic device and historical coreference information in the current conversation from a server;
   extracting content matching the current user request from the historical coreference information;
   updating the current user request based on the content to obtain an updated current user request; and
   generating a response of the current user request based on the updated current user request;
   wherein the historical coreference information comprises one or more historical user requests triggering coreference, and a plurality of coreference options corresponding to each historical user request,
   wherein extracting the content matching the current user request from the historical coreference information, comprises:
   when the current user request comprises an entity represented by an ordinal number, obtaining sequentially, in order of time from nearest to far, a historical user request from the historical coreference information as a to-be-processed historical user request;
   removing the entity represented by the ordinal number and a meaningless word from the current user request to generate a rewritten current user request;
   determining a second similarity of the rewritten current user request and the to-be-processed historical user request; and
   taking the to-be-processed historical request whose second similarity satisfies a second similarity threshold as the content matching the current user request;
   wherein, extracting the content matching the current user request from the historical coreference information, further comprises:
   when there is no to-be-processed historical request whose second similarity satisfies the second similarity threshold, determining whether the current user request satisfies a preset coreference inheritance condition;
   when the current user request satisfies the preset coreference inheritance condition, taking a historical user request closest to a current time point in the historical coreference information as the content matching the current user request; and
   when the current user request does not satisfy the preset coreference inheritance condition, determining that there is no content matching the current user request.

2. The method as claimed in claim 1, wherein, the historical coreference information comprises one or more historical user requests triggering coreference, and a plurality of coreference options corresponding to each historical user request,
   wherein extracting the content matching the current user request from the historical coreference information, comprises:
   when the current user request does not comprise an entity represented by an ordinal number, obtaining sequentially, in order of time from nearest to far, a historical user request from the historical coreference information as a to-be-processed historical user request;
   determining a first similarity of the current user request and each of a plurality of coreference options corresponding to the to-be-processed historical user request; and
   taking a coreference option whose first similarity satisfies a first similarity threshold as the content matching the current user request.

3. The method as claimed in claim 1, wherein, the coreference inheritance condition comprises a plurality of relevant words of coreference inheritance;
   determining whether the current user request satisfies the preset coreference inheritance condition, comprises:
   determining whether one or more relevant words exist in the current user request;
   when one or more relevant words exist in the current user request, determining that the current user request satisfies the coreference inheritance condition; and
   when one or more relevant words do not exist in the current user request, determining that the current user request does not satisfy the coreference inheritance condition.

4. The method as claimed in claim 1, wherein, the historical coreference information comprises one or more historical user requests triggering coreference, and a plurality of coreference options corresponding to each historical user request;
   wherein updating the current user request based on the content to obtain the updated current user request, comprises;
   when the content is the historical user request, determining a coreference option referred to by an entity represented by an ordinal number in the current user request based on a plurality of coreference options corresponding to the content and the current user request; taking the coreference option referred to by the entity represented by the ordinal number in the current user request as the updated current user request; and when the content is a coreference option, taking the content as the updated current user request.

5. The method as claimed in claim 1, further comprising:
determining whether the response comprises a plurality of coreference options;
when the response comprises the plurality of coreference options, updating the historical coreference information of the current conversation based on the current user request and the corresponding response.

6. An electronic device, comprising:
at least one processor; and
a memory communicating with the at least one processor; wherein,
the memory is configured to store instructions executable by the at least one processor, and when the instructions are executed by the at least one processor, the at least one processor is cause to perform:
obtaining a current user request in a current conversation from information input by a user in a current conversation box through the electronic device and historical coreference information in the current conversation from a server;
extracting content matching the current user request from the historical coreference information;
updating the current user request based on the content to obtain an updated current user request; and
generating a response of the current user request based on the updated current user request;
wherein the historical coreference information comprises one or more historical user requests triggering coreference, and a plurality of coreference options corresponding to each historical user request,
wherein extracting the content matching the current user request from the historical coreference information, comprises:
when the current user request comprises an entity represented by an ordinal number, obtaining sequentially, in order of time from nearest to far, a historical user request from the historical coreference information as a to-be-processed historical user request;
removing the entity represented by the ordinal number and a meaningless word from the current user request to generate a rewritten current user request;
determining a second similarity of the rewritten current user request and the to-be-processed historical user request; and
taking the to-be-processed historical request whose second similarity satisfies a second similarity threshold as the content matching the current user request;
wherein, extracting the content matching the current user request from the historical coreference information, further comprises:
when there is no to-be-processed historical request whose second similarity satisfies the second similarity threshold, determining whether the current user request satisfies a preset coreference inheritance condition;
when the current user request satisfies the preset coreference inheritance condition, taking a historical user request closest to a current time point in the historical coreference information as the content matching the current user request; and
when the current user request does not satisfy the preset coreference inheritance condition, determining that there is no content matching the current user request.

7. The device as claimed in claim 6, wherein, the historical coreference information comprises one or more historical user requests triggering coreference, and a plurality of coreference options corresponding to each historical user request,
wherein extracting the content matching the current user request from the historical coreference information, comprises:
when the current user request does not comprise an entity represented by an ordinal number, obtaining sequentially, in order of time from nearest to far, a historical user request from the historical coreference information as a to-be-processed historical user request;
determining a first similarity of the current user request and each of a plurality of coreference options corresponding to the to-be-processed historical user request; and
taking a coreference option whose first similarity satisfies a first similarity threshold as the content matching the current user request.

8. The device as claimed in claim 6, wherein, the coreference inheritance condition comprises a plurality of relevant words of coreference inheritance;
determining whether the current user request satisfies the preset coreference inheritance condition, comprises:
determining whether one or more relevant words exist in the current user request;
when one or more relevant words exist in the current user request, determining that the current user request satisfies the coreference inheritance condition; and
when one or more relevant words do not exist in the current user request, determining that the current user request does not satisfy the coreference inheritance condition.

9. The device as claimed in claim 6, wherein, the historical coreference information comprises one or more historical user requests triggering coreference, and a plurality of coreference options corresponding to each historical user request;
wherein updating the current user request based on the content to obtain the updated current user request, comprises:
when the content is the historical user request, determining a coreference option referred to by an entity represented by an ordinal number in the current user request based on a plurality of coreference options corresponding to the content and the current user request; taking the coreference option referred to by the entity represented by the ordinal number in the current user request as the updated current user request; and
when the content is a coreference option, taking the content as the updated current user request.

10. The device as claimed in claim 6, wherein, when the instructions are executed by the at least one processor, the at least one processor is cause to perform:
determining whether the response comprises a plurality of coreference options;
when the response comprises the plurality of coreference options, updating the historical coreference information of the current conversation based on the current user request and the corresponding response.

11. A non-transitory computer-readable storage medium storing computer instructions, wherein the computer instructions are configured to execute a method for generating a response, the method comprising:
obtaining a current user request in a current conversation from information input by a user in a current conversation box through an electronic device and historical coreference information in the current conversation from a server;

extracting content matching the current user request from the historical coreference information;

updating the current user request based on the content to obtain an updated current user request; and generating a response of the current user request based on the updated current user request;

wherein the historical coreference information comprises one or more historical user requests triggering coreference, and a plurality of coreference options corresponding to each historical user request, wherein extracting the content matching the current user request from the historical coreference information, comprises:

when the current user request comprises an entity represented by an ordinal number, obtaining sequentially, in order of time from nearest to far, a historical user request from the historical coreference information as a to-be-processed historical user request;

removing the entity represented by the ordinal number and a meaningless word from the current user request to generate a rewritten current user request;

determining a second similarity of the rewritten current user request and the to-be-processed historical user request; and taking the to-be-processed historical request whose second similarity satisfies a second similarity threshold as the content matching the current user request;

wherein, extracting the content matching the current user request from the historical coreference information, further comprises:

when there is no to-be-processed historical request whose second similarity satisfies the second similarity threshold, determining whether the current user request satisfies a preset coreference inheritance condition;

when the current user request satisfies the preset coreference inheritance condition, taking a historical user request closest to a current time point in the historical coreference information as the content matching the current user request; and when the current user request does not satisfy the preset coreference inheritance condition, determining that there is no content matching the current user request.

12. The storage medium as claimed in claim 11, wherein, the historical coreference information comprises one or more historical user requests triggering coreference, and a plurality of coreference options corresponding to each historical user request, wherein extracting the content matching the current user request from the historical coreference information, comprises:

when the current user request does not comprise an entity represented by an ordinal number, obtaining sequentially, in order of time from nearest to far, a historical user request from the historical coreference information as a to-be-processed historical user request;

determining a first similarity of the current user request and each of a plurality of coreference options corresponding to the to-be-processed historical user request; and taking a coreference option whose first similarity satisfies a first similarity threshold as the content matching the current user request.

13. The storage medium as claimed in claim 11, wherein, the coreference inheritance condition comprises a plurality of relevant words of coreference inheritance;

determining whether the current user request satisfies the preset coreference inheritance condition, comprises:

determining whether one or more relevant words exist in the current user request;

when one or more relevant words exist in the current user request, determining that the current user request satisfies the coreference inheritance condition; and when one or more relevant words do not exist in the current user request, determining that the current user request does not satisfy the coreference inheritance condition.

14. The storage medium as claimed in claim 11, wherein, the historical coreference information comprises one or more historical user requests triggering coreference, and a plurality of coreference options corresponding to each historical user request;

wherein updating the current user request based on the content to obtain the updated current user request, comprises:

when the content is the historical user request, determining a coreference option referred to by an entity represented by an ordinal number in the current user request based on a plurality of coreference options corresponding to the content and the current user request; taking the coreference option referred to by the entity represented by the ordinal number in the current user request as the updated current user request; and when the content is a coreference option, taking the content as the updated current user request.

* * * * *